US006950720B2

(12) United States Patent
Takeuchi

(10) Patent No.: US 6,950,720 B2
(45) Date of Patent: Sep. 27, 2005

(54) PRESET CONTROLLER OF COMPENSATOR IN ROTARY PRESS

(75) Inventor: Kunio Takeuchi, Yokohama (JP)

(73) Assignee: Kabushiki Kaisha Tokyo Kikai Seisakusho (JP)

( * ) Notice: Subject to any disclaimer, the term of this patent is extended or adjusted under 35 U.S.C. 154(b) by 531 days.

(21) Appl. No.: 10/084,412

(22) Filed: Feb. 27, 2002

(65) Prior Publication Data

US 2003/0089247 A1 May 15, 2003

(30) Foreign Application Priority Data

Jul. 12, 2001 (JP) ....................................... 2001-212369

(51) Int. Cl.[7] ................................................ G06F 19/00

(52) U.S. Cl. ....................... 700/183; 700/184; 700/193; 700/128; 700/134; 700/135; 700/213; 700/245; 100/155 R; 100/219; 101/216; 101/219

(58) Field of Search ................................ 700/213, 245, 700/159, 183, 184, 193, 128, 134, 135; 100/155 R, 219; 101/216

(56) References Cited

U.S. PATENT DOCUMENTS 4,719,575 A * 1/1988 Gnuechtel ................... 700/122
4,803,634 A * 2/1989 Ohno et al. ................. 700/213
4,882,764 A * 11/1989 Reynolds et al. ........... 382/112
4,955,265 A * 9/1990 Nakagawa et al. ............ 83/74
5,483,893 A * 1/1996 Isaac et al. ................. 101/485
5,500,801 A * 3/1996 Loffler ........................ 700/122

FOREIGN PATENT DOCUMENTS

JP 10109397 4/1998

* cited by examiner

*Primary Examiner*—Anthony Knight
*Assistant Examiner*—Thomas Pham
(74) *Attorney, Agent, or Firm*—Trexler, Abushnell, Giangiorgi, Blackstone & Marr, Ltd.

(57) ABSTRACT

A preset controller which performs preset control, which allows, in the case of updating and correcting a print operational condition for a print pattern number, another print operation for a different print pattern number to reflect the updated and corrected compensator set value. A preset controller of a compensator in a rotary press is provided. The rotary press includes a compensator for use in a paper leading course extending from a printing unit to a folding unit and a movement device for moving the compensator, and controls the movement device so that the compensator is moved to a preset location suitable for cutting a printed web at an optimum position thereof. The preset controller includes a set value reader for reading, based on a paper leading course number read by a data reader, a compensator number and a compensator set value corresponding to the paper leading course number.

8 Claims, 3 Drawing Sheets

PRESET CONTROLLER OF COMPENSATOR IN ROTARY PRESS

CROSS-REFERENCE TO RELATED APPLICATION

This application is based on and claims the benefit of priority from the prior Japanese Patent Application No. 2001-212369, filed on Jul. 12, 2001, the entire contents of which are incorporated herein by reference.

BACKGROUND OF THE INVENTION

1. Field of the Invention

The present invention relates to a preset controller of a compensator, which determines a paper leading course in accordance with information on a print operational condition, and controls a movement device of a compensator so as to move the compensator to a preset location on the paper leading course.

2. Description of the Related Art

JP 7-17054B publication discloses an example of conventional control on a preset device in a rotary press. The preset device disclosed in JP 7-17054B is provided with one print pattern number (paper leading pattern number) per print operational condition. A plurality of paper leading courses extending from a plurality of paper feeders to folding unit are stored in a storage, per print pattern number, combined with a plurality of location set values for all compensators on the plurality of paper leading courses. When a print pattern number is input, the location set values for all compensators on the plurality of paper leading courses at the print pattern number are read out of the storage. On the basis of the set values read out, the compensators are controlled to move.

In the conventional preset device in a rotary press, paper leading courses and set values for compensator locations used per print operational condition or per print pattern number are stored in a storage device. Therefore, among a plurality of print operational conditions, even if an actual paper leading course and a location set value at the time of a print operation for a certain compensator are identical to those for others, the certain compensator is handled as quite different one. This is because print pattern numbers differ from one another on every print operational condition.

For example, in case that two print pattern numbers may correspond to an identical paper leading course and compensator location set value but different print pages, even if one compensator location set value is updated and corrected in one print operation, another compensator location set value in the other print operation can not reflect this update and correction.

Accordingly, it is required to repeatedly update and correct a location set value for a compensator per print pattern. If the update and correction is not implemented before print, the print may result in a printed web failed to be cut appropriately.

SUMMARY OF THE INVENTION

The present invention has an object to provide a preset controller capable of performing preset control, which allows, in the case of updating and correcting a set value determined on a compensator location for one print pattern number, a print operation for another print pattern number to reflect the updated and corrected compensator set value.

To achieve the above object, the present invention is provided with a preset controller to a compensator in a rotary press, said rotary press including a compensator for use in a paper leading course extending from a printing unit to a folding unit and a movement device for moving said compensator, and controlling said movement device so that said compensator is moved to a preset location suitable for cutting a printed web at an optimum position thereof, said preset controller comprising: a first storage for storing, per print operational condition, at least, a combination of a print page assignment on each printing unit corresponding to said print operational condition and said paper leading course number for designating said paper leading course extending from said printing unit to a folding unit, together with an individual print pattern number added thereto; a second storage for storing, per paper leading course number, at least, a combination of said compensator number for designating said compensator corresponding to said paper leading course number and a compensator set value for determining a location of said compensator for cutting a printed web at an appropriate position thereof; an input unit for inputting a print pattern number to designate a print operational condition to be implemented; a data reader for reading, based on said print pattern number inputted by said input unit, said print page assignment on each printing unit and said paper leading course number corresponding to said print pattern number, from said first storage; a set value reader for reading, based on said paper leading course number read by said data reader, said compensator number and said compensator set value corresponding to said paper leading course number, from said second storage; and an operation signal output unit for outputting, based on said compensator number and said compensator set value read by said set value reader, an operation signal to said movement device so as to operate said movement device to move said compensator.

As obvious from the above, in the compensator preset controller according to the present invention, while the compensator number and the corresponding compensator set value are stored in the storage, they are not directly associated with the print pattern number. Instead, they are indirectly associated with the print pattern number through the paper leading course number. Therefore, the compensator number and the corresponding compensator set value, once utilized for some print pattern number, can be employed, through the corresponding paper leading course number, for other print pattern numbers. At the time of a print operation under some print pattern number, the compensator set value, associated with the paper leading course number stored in the second storage, can be updated and corrected. In this case, where another print pattern number is associated with the paper leading course number corresponding to the updated and corrected compensator set value, the updated and corrected compensator set value can be employed under the other print pattern number. An operator is not required to update and correct the set value to the latest one, every time when a print operation with a different print pattern number is performed. This is effective to prevent an occurrence of a failed print web due to a mistakenly set value and reduce a burden on the operator.

Preferably, the preset controller of the compensator according to the present invention further comprises a display for displaying the print page assignment and the paper leading course number read from the first storage by the data read unit.

In addition, in the compensator preset controller according to the present invention, the first and second storage may be contained in integral hardware. For example, if two holders are provided in a hard disc, they may be employed as the first and the second storage, respectively.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Figure 1:
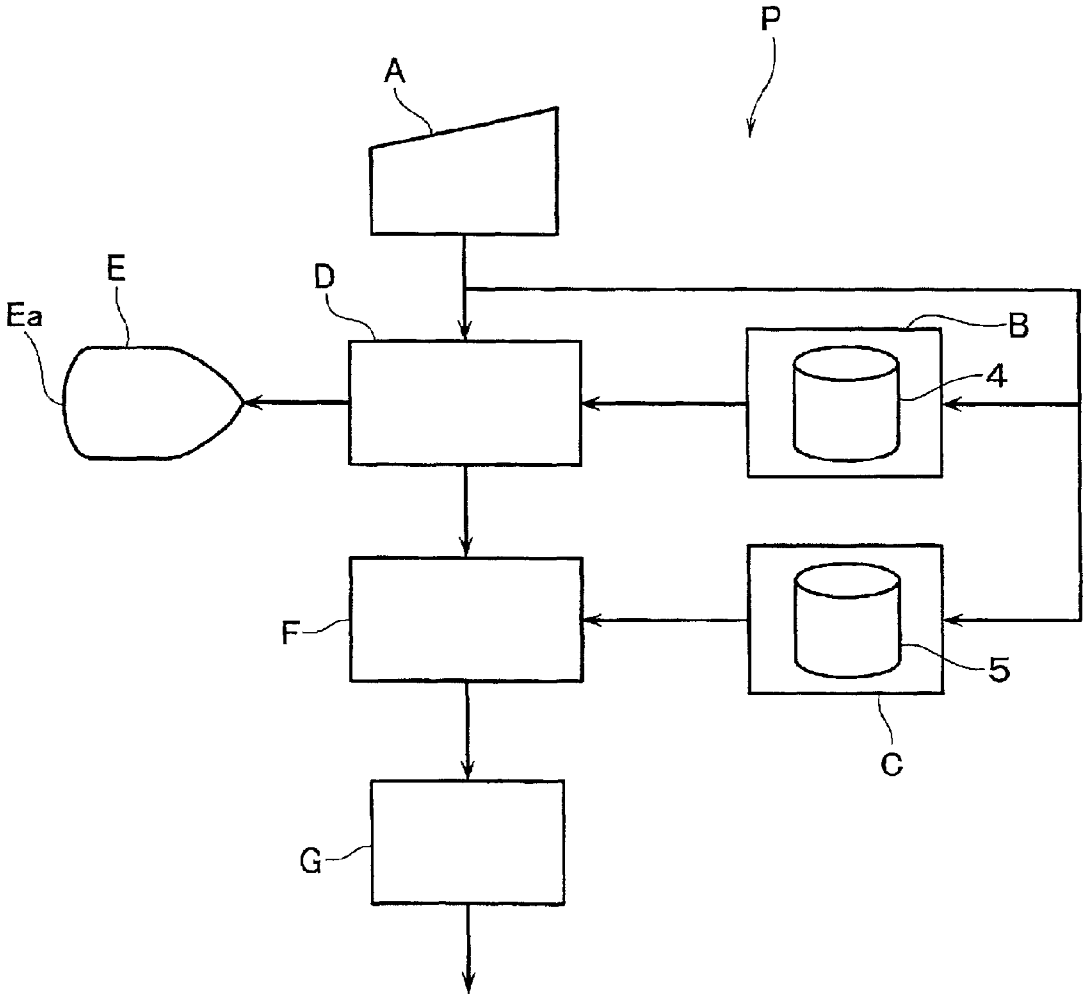
FIG. 1 is a block digram showing an arrangement of a preset controller of a compensator in a rotary press according to an embodiment of the present invention.
Figure 2:
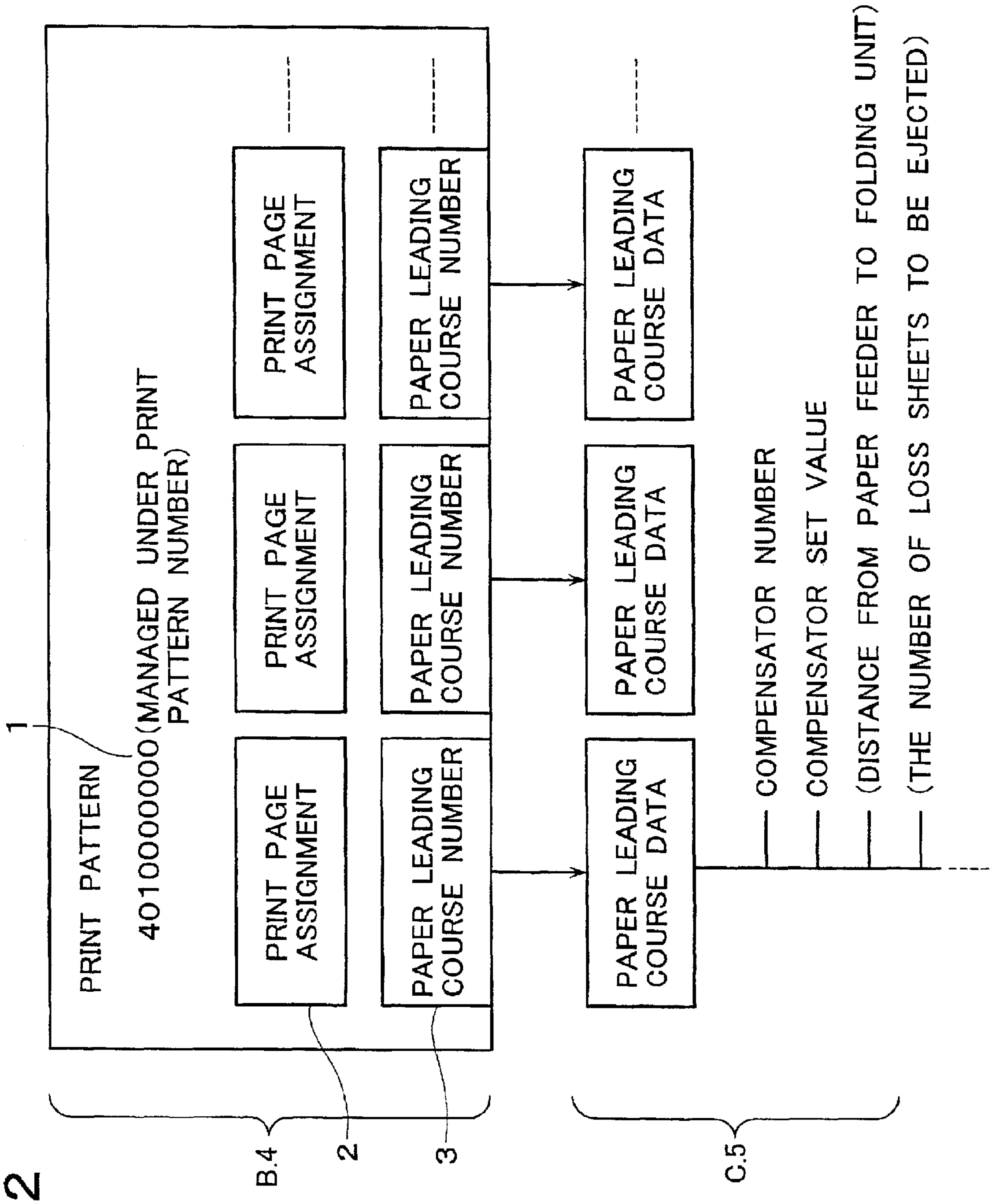
FIG. 2 is a schematic diagram of configurations of data stored in memory tables in the first and second storage in the compensator preset controller according to the same embodiment.
Figure 3:
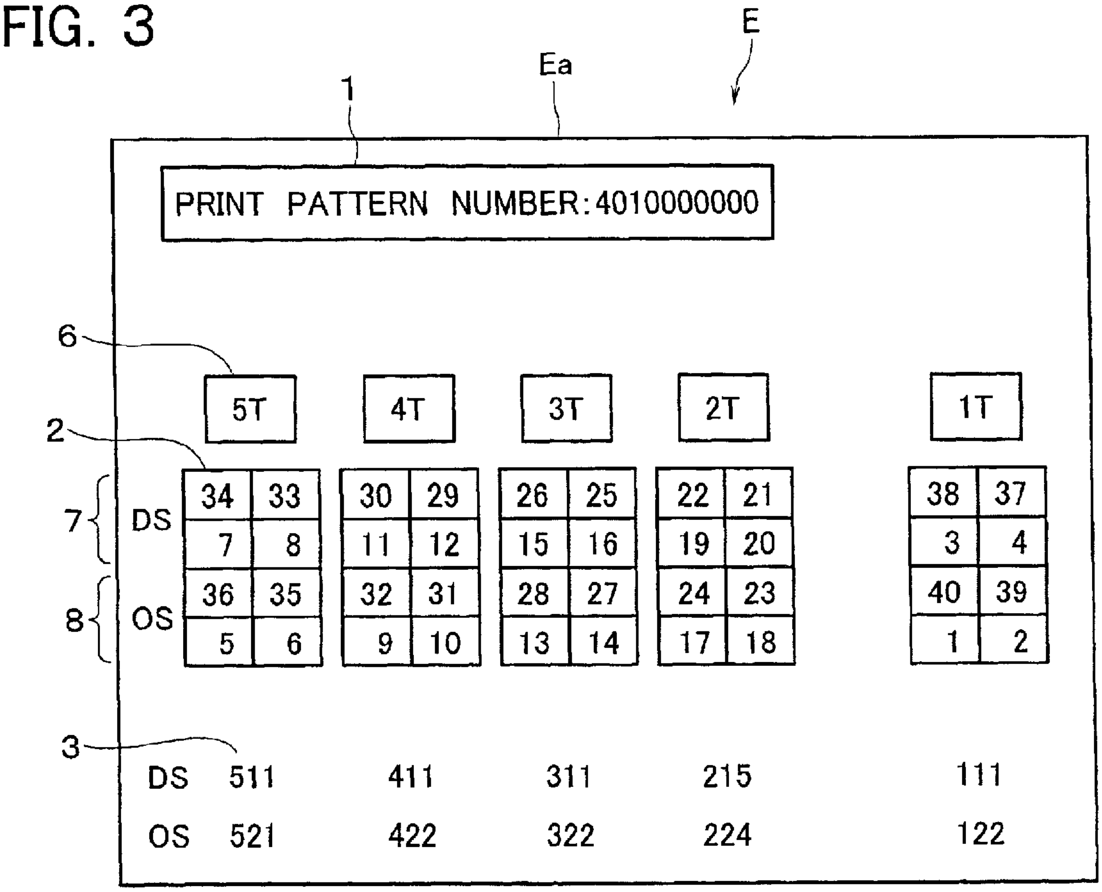
FIG. 3 is a schematic diagram of a screen on a display in the compensator preset controller according to the same embodiment.
Figure 4:
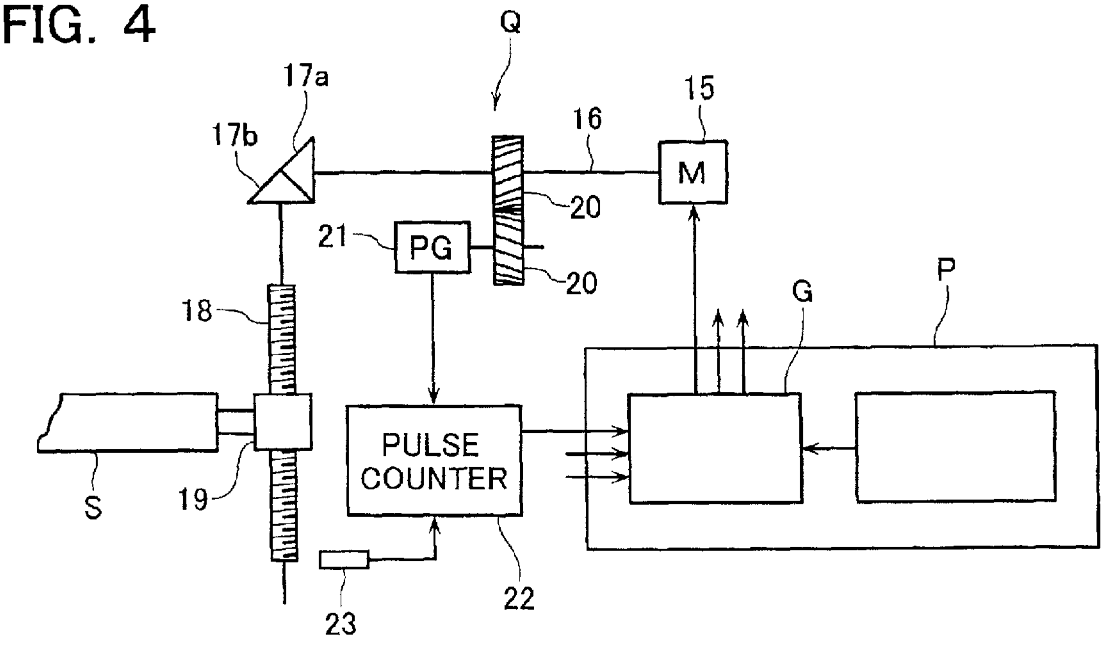
FIG. 4 is a block diagram showing a movement device in relation to the compensator preset controller according to the same embodiment.

An embodiment of the compensator preset controller in a rotary press according to the present invention will be described next with reference to the drawings. FIG. 1 is a block diagram showing an arrangement of the compensator preset controller in a rotary press according to an embodiment of the present invention. FIG. 2 is a schematic diagram of configurations of data stored in memory tables in the first and second storage in FIG. 1. FIG. 3 is a schematic diagram of a screen on a display in FIG. 1. FIG. 4 is a block diagram showing a movement device in relation to the compensator preset controller.

As shown FIG. 1, a preset controller P of a compensator in a rotary press in this embodiment comprises an input unit A, a first storage B, a second storage C, a data reader D, a display E, a set value reader F and an operation signal output unit G. The input unit A includes input equipment such as a keyboard. Through the use of the input unit A, an operator can input a print pattern number 1 corresponding to a specific print operational condition (see FIG. 3), for example.

The first storage B includes a memory table 4 having an appropriate storage capacity. As shown in FIG. 2, the memory table 4 is employed to store data, per print pattern number 1, relating to a print page assignment 2 on each printing unit and a paper leading course number 3 for designating a paper leading course extending from each printing unit to a folding unit. The print page assignment 2 on each printing unit is stored in such a manner that, for example, in the case of a newspaper, print pages are assigned to eight print areas in each printing unit.

The second storage C includes a memory table 5 having an appropriate storage capacity. The memory table 5 is employed to store, per paper leading course number 3 as shown in Table 1 and FIG. 2, a combination of a compensator number for designating a compensator for use in the paper leading course and a set value determined on a compensator location for cutting a printed web at an appropriate position thereof.

TABLE 1

| Paper leading course number;111 | Paper leading course number;112 | . . . | Paper leading course number; 521 |
|---|---|---|---|
| Printing unit 1T DS (Drive side) | Printing unit 1T OS (Operation side) | . . . | Printing unit 5T OS (Operation side) |
| Compensator number 1 | Compensator number 2 | . . . | Compensator number 10 |
| Set value 183 | Set value 150 | . . . | Set value 270 |

The data reader D is configured to receive the print pattern number 1 inputted by the input unit A, corresponding to the print pattern number 1, to read the data of the print page assignment 2 on each printing unit and the paper leading course number 3 from the memory table 4 in the first storage B, to send the read-out data to the display E and the set value reader F.

The display E includes a screen Ea as shown in FIG. 3. The screen Ea is employed to display the print pattern number 1, the print page assignment 2 and the paper leading course number 3 received from the data reader D thereon.

The set value reader F is configured, when the set value reader F receives the paper leading course number 3 from the data reader D, to read the compensator number and the compensator location set value, corresponding to the paper leading course number 3, from the memory table 5 in the second storage C, to create an "compensator edited result" that contains compensator numbers rearranged with set values thereof as shown in Table 2, and then to send the data relating to the "compensator edited result" to the operation signal output unit G.

TABLE 2

| Compensator edited result | |
|---|---|
| compensator number | Set value |
| 1 | 183 |
| 2 | 150 |
| 3 | 230 |
| 4 | 387 |
| 5 | 265 |
| 6 | 219 |
| 7 | 156 |
| 8 | 267 |
| 9 | 289 |
| 10 | 270 |

A set value for a compensator S shown in Table 2 represents a location of each compensator by a distance from a preset reference location (for example, zero point). Each relation of the set value to the compensator number: 183 mm to No. 1; 150 mm to No. 2; 230 mm to No. 3; 387 mm to No. 4; 265 mm to No. 5; 219 mm to No. 6; 156 mm to No. 7; 267 mm to No. 8; 289 mm to No. 9 and 270 mm to No. 10, means that each compensator should be positioned at a location apart a certain distance indicated by the set value from the preset reference location.

The operation signal output unit G is configured to receive the set value read and edited by the set value reader F, and to output, based on the compensator number and the set value, an operation signal, which moves the compensator S to a certain location indicated by the set value, to an adjusting motor 15 that is contained in a compensator movement device Q shown in FIG. 4.

The adjusting motor 15 is configured, for example, when a control signal is supplied to the adjusting motor 15 for moving the compensator S to a location indicated by a set value of 185 mm, to rotate until the compensator S reaches the location spaced 185 mm from the reference location.

Revolutions of the adjusting motor 15 are transmitted from a spindle 16 through bevel gears 17*a*, 17*b* to a threaded rod 18, of which revolutions move a housing 19 screw-combined with the rod 18, then move the compensator S supported by the housing 19.

Revolutions of the spindle 16 are also transmitted through gears 20 to a pulse generator 21 such as a rotary encoder, which generates pulses as the spindle 16 rotates. These pulses are counted at a position detector 22 including a pulse counter, of which counted value is fed back to the operating signal output unit G.

The reference numeral 23 in FIG. 4 denotes a zero point detector for detecting the fact that the compensator S reaches a zero point of the reference location. The zero point detector 23 is configured to output a signal for use in reset of the position detector 22. The position detector 22 is configured to count up pulses from the pulse generator 21 when the compensator S moves away from the zero point decoder 23.

The operation signal output unit G possesses the feedback signal inputted from the position detector 22 and compares the processed value with the set value of 185 mm to stop the adjusting motor 15 when the counted value meets with the set value of 185 mm. Thus, the compensator S can be positioned at the location designated by the set value for the compensator S corresponding to the paper leading course on the print pattern 1.

After the preset controller P of the compensator operates to preset the compensator S to the location determined by the set value, followed by a print operation, the printed web may occasionally not be cut at an appropriate position. In this case, it is possible to operate the input unit A to update and correct the set value for the compensator S to an appropriate value in the memory table 5 in the second storage C.

The memory table 5 in the second storage C may be employed to store not only the compensator number and compensator set value but also data such as combination in a distance from the paper feeder to the folding unit with the number of loss sheets to be ejected for allowing a folding unit to automatically eject loss sheets pasted at a paper feeder.

In the compensator preset controller P according to the embodiment, a new print pattern number 1 can be registered as described below. First, the new print pattern number 1 is determined for a new print pattern based on a print operational condition, which includes, at least a printing unit for use in the print operation, a folding unit, total pages, color pages and an ejection form at the folding unit. Corresponding to the new print pattern number 1, an assignment 2 of pages to be printed in each printing unit and a paper leading course extending from each printing unit to a folding unit are determined per half-width printed web that runs on the drive side (DS) 7 and the operation side (OS) 8 in each printing unit 6. In this case, if a new paper leading course is present, a new paper leading course number 3 is given to it. These are inputted by the input unit A to be associated with each other under the new print pattern number 1 and to store in the first storage B. As for the new paper leading course, under the paper leading course number 3 newly determined, the compensator number and the set value for the compensator on the paper leading course are associated with each other and inputted by the input unit A to store in the second storage C. Where the compensator number and the set value for the compensator on the same paper leading course have already been stored in the second storage C, they are not required to be stored with a new paper leading course number 3. In this case, the paper leading course number 3 already stored can be employed.

Operations of the preset controller for the compensator S according to the embodiment will be described next. First, when the input unit A is employed to inputted the print pattern number 1, corresponding to the inputted print pattern number 1, the data reader D reads the data of the print page assignment 2 and the paper leading course number 3 from the memory table 4 in the first storage B. Then, the data reader D sends the data together with the print pattern number 1 to the display E and the set value reader F.

When the display E receives the print pattern number 1, the print page assignment 2 and the paper leading course number 3 from the data reader D, it displays them on the screen Ea shown in FIG. 3.

When the set value reader F receives the paper leading course number 3 from the data reader D, corresponding to the paper leading course number 3, it reads the compensator number and the set value determined for the compensator location from the memory table 5 in the second storage C. The set value reader F creates the "compensator edited result" that contains compensator numbers rearranged with set values thereof as shown in Table 2. Then, it sends the data relating to the "compensator edited result" to the operation signal output unit G.

Then, based on the received compensator number and set value thereof, the operation signal output unit G sends an operation signal for moving a compensator to a location indicated by the set value to the adjusting motor 15. Thus, the adjusting motor 15 can move the compensator to the location indicated by the set value.

In the compensator preset controller according to the present invention, when a compensator set value is updated and corrected on some print pattern number 1, the value is stored in the second storage C. Therefore, other print pattern numbers can reflect the updated and corrected compensator. Therefore, other print pattern numbers can reflect the updated and corrected compensator set value if they are associated with the same paper leading course number as that corresponding to the updated and corrected compensator set value.

As obvious from the forgoing, in the compensator preset controller according to the present invention, the compensator number and the corresponding compensator set value are stored in the storage while they are not directly associated with the print pattern number. Instead, they are indirectly associated with the print pattern number through the paper leading course number. Therefore, the compensator number and the corresponding compensator set value, once utilized for some print pattern number, can be employed, through the corresponding paper leading course number, for other print pattern numbers. Accordingly, the present invention can provide a preset controller capable of performing preset control, which allows, in the case of updating and correcting a print operational condition for one print pattern number, a print operation for another print pattern number to reflect the updated and corrected compensator set value.

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A preset controller of a compensator in a rotary press, said rotary press including a compensator for use in a paper leading course extending from a printing unit to a folding unit and a movement device for moving said compensator, and controlling said movement device so that said compensator is moved to a preset location suitable for cutting a printed web at an optimum position thereof, said preset controller comprising: a storage for storing per print operational condition, at least a combination of a print page assignment on each printing unit corresponding to a print operational condition and a paper leading course number for designating said paper leading course extending from said printing unit to said folding unit, together with an individual print pattern number added thereto; further comprising a second storage for storing, per paper leading course number, at least, a combination of a compensator number for designating said compensator corresponding to said paper leading course number and a compensator set value for determining a location of said compensator for cutting the printed web at an appropriate position thereof; further comprising an input for inputting a print patter number to designate the print operational condition to be implemented; further comprising a data reader for reading, based on said print pattern number inputted by said input unit, said print page assignment on each printing unit and said paper leading course number corresponding to said print pattern number, from said storage; and further comprising a set value reader for reading, based on said paper leading course number read by said data reader, said compensator number and said compensator set value corresponding to said paper leading course number, from said second storage.

2. The preset controller as defined in claim 1, further comprising an operation signal output unit for outputting, based on said compensator number and said compensator set value read by said set value reader, an operation signal to said movement device so as to operate said movement device to move said compensator.

3. The preset controller of the compensator according to claim 1, further comprising a display for displaying said print page assignment and said paper leading course number read from said storage by said data reader.

4. The preset controller as defined in claim 1, further comprising an input unit for inputting a print pattern number to designate the print operational condition to be implemented.

5. The preset controller as defined in claim 1, further comprising an input unit for inputting a print pattern number to designate the print operational condition to be implemented.

6. The preset controller as defined in claim 1, further comprising an input unit for inputting a print pattern number to designate the print operational condition to be implemented.

7. The preset controller as defined in claim 1, further comprising an input unit for inputting a print pattern number to designate the print operational condition to be implemented.

8. The preset controller as defined in claim 2, further comprising an input unit for inputting a print pattern number to designate the print operational condition to be implemented.

* * * * *